United States Patent [19]

Fassett

[11] 4,266,808

[45] May 12, 1981

[54] OVERHEAD GUARD FOR LIFT TRUCK

[75] Inventor: Nyle W. Fassett, Georgetown, Ky.

[73] Assignee: Clark Equipment Company, Buchanan, Mich.

[21] Appl. No.: 83,910

[22] Filed: Oct. 11, 1979

[51] Int. Cl.$^{3}$ .............................................. B60R 21/02

[52] U.S. Cl. .................................... 280/756; 248/548; 414/914

[58] Field of Search ................ 414/914; 280/748, 756; 248/475 B, 548, 549; 403/2; 52/98

[56] References Cited

U.S. PATENT DOCUMENTS 3,289,871 12/1966 La Tourneau et al. ......... 414/914 X 3,520,571 7/1970 Rogers ............................ 280/748 X 3,536,353 10/1970 Goodacre ........................ 280/756 X 4,026,378 5/1977 DePriester ....................... 414/914 X

*Primary Examiner*—Jeffrey V. Nase

*Attorney, Agent, or Firm*—John C. Wiessler

[57] ABSTRACT

An overhead guard in which the rear legs are connected to a lift truck such that when struck from the front side one or both legs pivot rearwardly out of the area of the driver's compartment so that the driver is protected from being pinned against a guard leg. The guards are positively secured in other directions so that they resist forces imposed from either side or from the rear of the guard.

4 Claims, 3 Drawing Figures

OVERHEAD GUARD FOR LIFT TRUCK

BACKGROUND OF THE INVENTION

Heretofore in certain types of lift trucks, such as a stand-up rider type, the rear legs of the overhead guard may injure the driver if he is propelled into one of the rear legs for any reason.

SUMMARY

My invention provides a one-way or impositive connection of the rear legs of an overhead guard to the rear section of a lift truck. Brackets connect the legs to the truck in a manner which resists forces imposed on a leg from either side or the rear while permitting each leg to swing rearwardly of the truck in a break-away movement resulting from forces imposed on the front sides thereof, thus tending to protect the driver against injuries which may otherwise be sustained if the driver is propelled against the front side of either said guard leg.

DESCRIPTION OF THE PREFERRED EMBODIMENT

Figure 1:
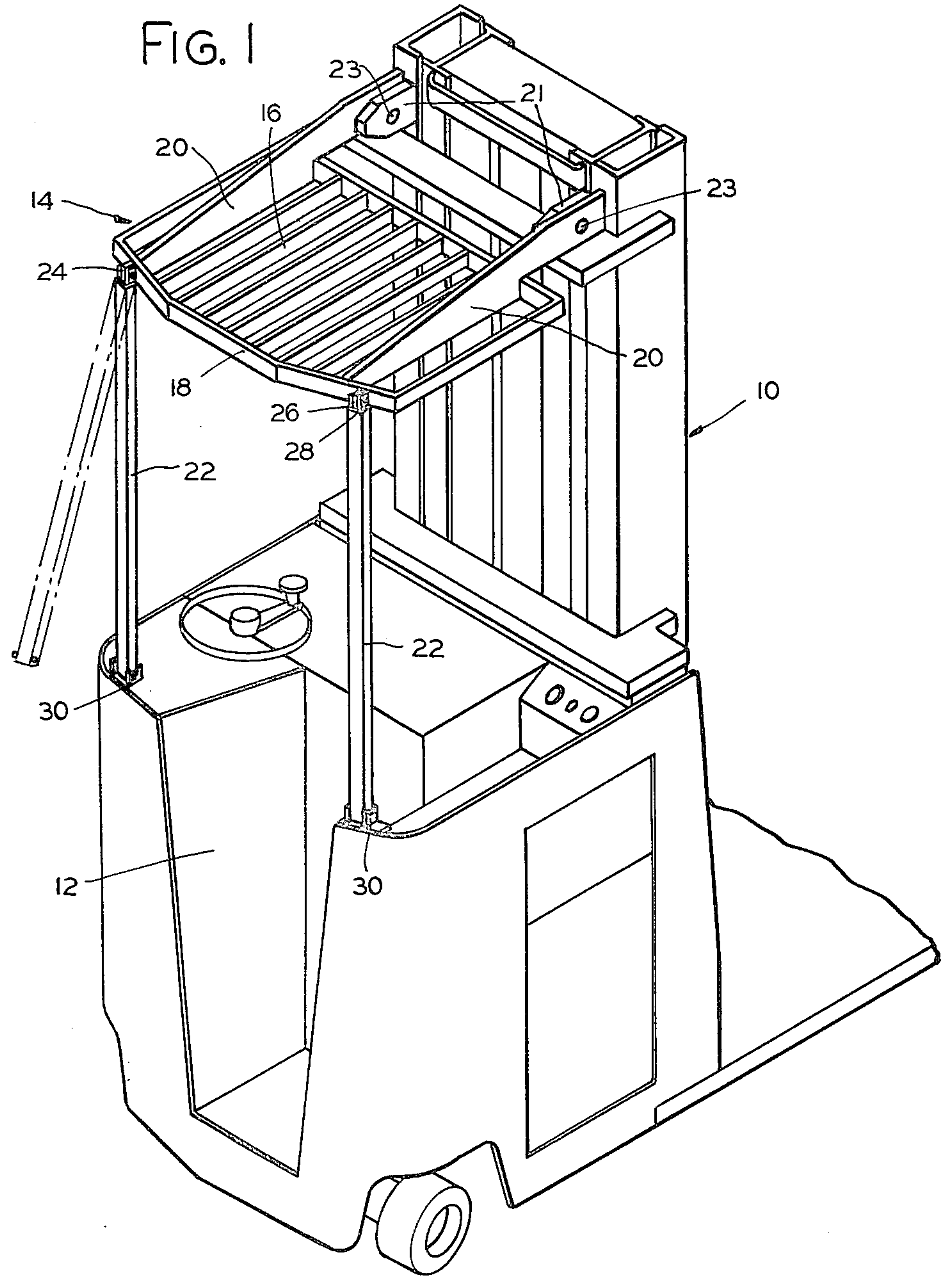
FIG. 1 is a perspective view of a stand-up rider type lift truck which embodies my invention.
Figure 2:
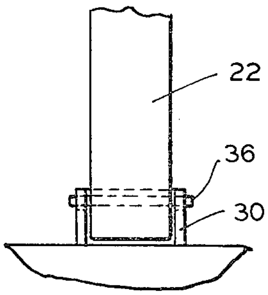
FIGS. 2 and 3 are front and side views of the connection to the lift truck of the rear break-away leg.

The lift truck illustrated is of a well-known type having an upright assembly 10, an operator's compartment 12 including various controls for driving and steering the truck, and an overhead guard assembly 14. An upper grid section 16 of the overhead guard has an outer connecting rail 18; it is connected to the upright by a pair of elongated connecting plates 20 and brackets 21 which are welded to the upright flanges and secured to plates 20 by bolts 23, plates 20 being secured at the rear ends to rail 18, as by welding. A pair of rear legs 22 are located in transverse spaced relation, being connected at the upper ends to the rear side of rail 18 by pivot pin and bracket connections 24, the bracket being secured at each side to rail 18 for receiving centrally a projection 26 at the top end of each leg which receives in a registrable opening a pin 28.

Figure 3:
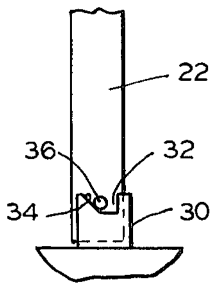

Secured, as by welding, to the rear end of the truck adjacent each side thereof is a U-shaped bracket 30 opening to the rear of the truck and having formed in the upper edges of each upper surface of the legs thereof a slot 32 which is cut on the square at the front side and at approximately a 45° slope on the rear side as illustrated at numeral 34. A pin member 36 extends through the lower end portion of each leg 22 and is secured rigidly thereto, it being located so as to register in the slotted portion of the legs of each U-bracket 30 as best shown in FIG. 3.

As will be appreciated the legs 22 are prevented by the U-brackets from moving under a force imposed from either side or the rear which protects the driver from injury from a guard leg being actuated into the driver by any such force. That is, if either or both legs are struck from the side or rear they are prevented from pivoting against the driver. On the other hand, the driver is protected from being pinned against either guard leg if it is struck by an object from the front because the roll pin connection to each bracket 30 rides up slope 34 of the slot allowing the leg to dislodge from the bracket and swing freely to the rear, as represented in the broken line showing of the one leg in FIG. 1.

It will be apparent to those skilled in the art that various changes in the structure and relative arrangement of parts may be made without necessarily departing from the scope of my invention.

I claim:

1. In a lift truck of the stand-up rider type having an operator's compartment at the rear of the truck and an operator's overhead guard extending over the compartment, the improvement comprising a pair of transversely spaced overhead guard rear support legs connected pivotably at the upper ends to the overhead portion of the guard and connected at the lower ends to the lift truck for pivotal break-away movement towards the rear of the truck about the upper pivotal connections thereof when the front side of a rear leg is struck with sufficient force, each rear leg having a semi-positive connection to the truck which permits said rearward pivotal movement in said one direction while inhibiting pivotal movement forwardly and to both sides.

2. A lift truck as claimed in claim 1 wherein said connection to the truck comprises bracket means secured to the truck adjacent each lower end of the guard legs for receiving the guard leg ends between a pair of sides thereof, said bracket sides being adapted to receive a projecting portion of each leg end which is adapted to escape from the bracket means during said rearward pivotal movement of the leg.

3. A lift truck as claimed in claim 1 wherein U-shaped bracket means opening rearwardly of the truck having a pair of sides and a connecting base connect the lower end of each rear leg to the truck such that the leg is adapted to pivot rearwardly of the truck through the open end of the bracket means whereas movement forwardly or to either side of the truck is inhibited by the sides and base of the backet means.

4. A lift truck as claimed in claim 3 wherein slots are formed in the sides of each U-shaped bracket means having surfaces which slope upwardly and rearwardly of the truck, and a projection connected to each leg normally engaging the bracket slots which is adapted to escape from said slots in a rearward direction along the slope thereof as the leg is pivoted rearwardly when the front side thereof is struck with sufficient force.

* * * * *